United States Patent [19]

Dunseith

[11] 4,378,979
[45] Apr. 5, 1983

[54] METHOD AND APPARATUS FOR PURGING AND ISOLATING A FILTER COMPARTMENT WITHIN A BAGHOUSE INSTALLATION

[75] Inventor: S. Michael Dunseith, Louisville, Ky.

[73] Assignee: Allis-Chalmers Corporation, Milwaukee, Wis.

[21] Appl. No.: 310,128

[22] Filed: Oct. 9, 1981

[51] Int. Cl.³ .............................................. B01D 46/04
[52] U.S. Cl. ....................................... 55/96; 55/20; 55/266; 55/267; 55/287; 55/303
[58] Field of Search ................... 55/20, 21, 80, 96, 97, 55/261, 266, 267, 269, 286, 287, 288, 302, 303, 73

[56] References Cited
U.S. PATENT DOCUMENTS 3,057,137 10/1962 Perlis et al. ............................ 55/303
3,178,868 4/1965 Gibby ....................................... 55/96
3,266,225 8/1966 Barr ....................................... 55/303
3,325,979 6/1967 Smith ..................................... 55/302
3,630,004 12/1971 Adair et al. ............................ 55/286
3,945,400 3/1976 Slakey .................................... 55/302
4,010,013 3/1977 Murayama ............................. 55/266
4,277,255 7/1981 Apelgren ................................ 55/20

FOREIGN PATENT DOCUMENTS 55-40287 10/1980 Japan ...................................... 55/97

Primary Examiner—David L. Lacey
Attorney, Agent, or Firm—Thomas G. Anderson

[57] ABSTRACT

A method and apparatus for purging hot flue gases from one or more of the filter compartments in a baghouse installation wherein heated ambient air is admitted to the reverse air system of the installation which directs the ambient air into the compartments to purge the gases from the compartments.

10 Claims, 7 Drawing Figures

METHOD AND APPARATUS FOR PURGING AND ISOLATING A FILTER COMPARTMENT WITHIN A BAGHOUSE INSTALLATION

BACKGROUND OF THE INVENTION

1. Field of the Invention

The present invention relates to a flue gas cleaning system and in particular to a method and apparatus for minimizing condensation of corrosive agents in the filter compartments of a baghouse installation.

2. Description of the Prior Art

In the typical baghouse installation, flue gases are drawn from a common inlet manifold into a bank of filter compartments wherein the gases are filtered through a plurality of filter bags to remove the suspended particulates from the gases. The filtered gases then exit the compartments and flow into a common outlet manifold from which they are directed into a chemical scrubber to remove the sulfur oxides and other corrosive agents in the gases prior to discharging them into the atmosphere.

In systems of this type, it has been the practice to admit the gases into the filter compartments at a temperature above the dew point temperature of the corrosive agents in the gases while maintaining a relatively uniform gas flow through each of the compartments. This prevents the formation of stagnate gas zones in the filter compartments where the gases could cool down below the dew point of the corrosive agents which would cause the agents to condense in the compartments. For this reason, it has generally been necessary to close off or isolate one or more of the filter compartments when the gas flow rate drops due to a reduced load on the boilers served by the system in order to maintain an adequate flow rate in the remaining compartments. However, when one of the compartments is isolated, the flue gases trapped in the compartment begin to cool and ultimately the corrosive agents condense if the compartment is not put back on line before the temperature of the gases drops below the dew point.

In addition to the foregoing, experience has indicated that even greater accumulations of corrosive agents can be expected to form in the isolated compartments as a result of condensation in the flue gases seeping through the dampers closing off the isolated compartments. For example, in a baghouse installation where each compartment is designed to clean about 80,000 ACFM (actual cubic feet per minute) of the gases, the seepage rate through each of the isolated compartments is in the range of 80–400 ACFM or 0.1–0.5 percent of the gas flowing through the compartment during normal filtering operations. Assuming the flue gases include about 10 parts per million $SO_3$, which is fairly typical for a coal fired boiler, as the isolated compartment cools the filter bags will be exposed to about 15 gallons of sulfuric acid condensing out of the flue gases trapped in the compartment when it was isolated, and 2–10 gallons of acid for each hour the compartment is kept off line.

Considering the above, it can be seen that acid condensation in the isolated compartments can have a very deleterious effect on the life of the filter bags and the metal housing of the baghouse installation, as well as increasing pressure losses in the gases as they flow through the compartments due to deterioration of the filter bags and the accumulation of sulfates and other particulates on the bags which generally cannot be dislodged by conventional bag cleaning procedures. Moreover, it should be noted that while the filter bags will be subject to acid attack when the compartments are isolated at a temperature below the dew point of the corrosive agents, they will also be exposed when the isolated compartments are brought back on line, or alternatively, when they are taken off line and allowed to cool for routine maintenance, thus further aggravating the problems associated with acid formation within the compartments.

SUMMARY OF THE INVENTION

The present invention relates to a flue gas cleaning system and in particular to a method and apparatus for purging flue gases from the filter compartments of a baghouse installation and thereafter isolating one or more of the compartments within the installation while maintaining normal filtering operations in the remaining compartments. This invention is related to the applicant's copending U.S. patent applications having Ser. Nos. 310,132 and 310,133 having the same filing date as this application.

In the baghouse installation embodying the invention, flue gases are drawn at subatmospheric pressures from a common inlet manifold into a bank of parallel filter compartments wherein the gases are filtered through a plurality of filter bags. The filtered gases leave the filter compartments and flow into a common outlet manifold from where they are directed into a chemical scrubber or the like prior to discharging them to the atmosphere. In order to maintain a sufficient flow rate in the flue gases flowing through the compartments when the flow rate of the flue gases drops due to a reduced load on the boiler served by the baghouse installation, one or more of the filter compartments are taken off line and isolated within the installation. This results in all of the flue gases being directed through the remaining compartments to maintain the flow rate within those compartments at the desired level.

The baghouse installation is provided with a reverse gas cleaning system which is adapted to periodically direct a stream of filtered gases from the outlet manifold through the filter bags in a direction countercurrent to the normal flow of the flue gases through the compartment to dislodge particulate materials accumulating on the bags during normal filtering operations. When it is desired to purge the flue gases from one of the compartments, the outlet of the compartment is closed off and then the reverse gas conduit connecting the outlet manifold to the filter compartment is similarly closed off. Thereafter, the operator opens a damper on the reverse gas conduit which allows heated ambient air to be drawn into the conduit and blown into the filter compartment to carry the flue gas out of the compartment into the inlet manifold. In this regard, it should be noted that as the air flows into the conduit it is heated to a temperature near the dew point temperature of the corrosive agents in the gas stream to prevent it from cooling the gases to the point at which the corrosive agents begin to condense within the compartment. This arrangement can also be used to heat the filter bags and the structure of the compartment after it has been allowed to cool down for maintenance prior to putting it back on line.

After the flue gases are purged from the compartment, the compartment is isolated by closing an inlet damper to close off the inlet of the compartment. Then, an ambient air damper on the compartment is opened to vent it to the atmosphere to form a pressure barrier within the compartment which prevents the flue gases from seeping into the compartment, or alternatively, a damper having a pair of spaced closure members mounted within the inlet duct connecting the inlet manifold to the inlet of the compartment is closed to provide a similarly pressurized chamber within the inlet duct which blocks any seepage of the flue gases into the compartment.

From the foregoing, it can be seen that the invention contemplates an arrangement which essentially eliminates acid condensation in the filter compartments when they are isolated or taken off line for maintenance as well as when they are put back on line; however, it is to be understood that various changes can be made in the arrangement, form, and construction of the apparatus disclosed herein without departing from the spirit and scope of the invention.

DESCRIPTION OF THE PREFERRED EMBODIMENT

Figure 1:
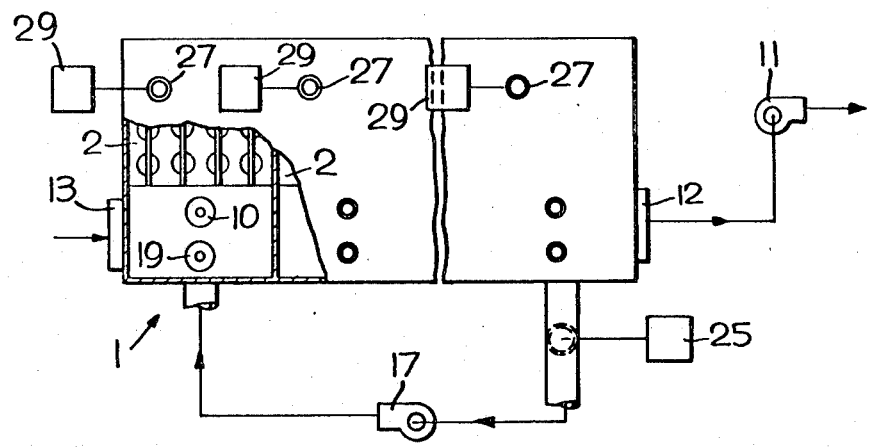
FIG. 1 is a top plan view, partially in section, of the baghouse installation embodying the invention.
Figure 3:
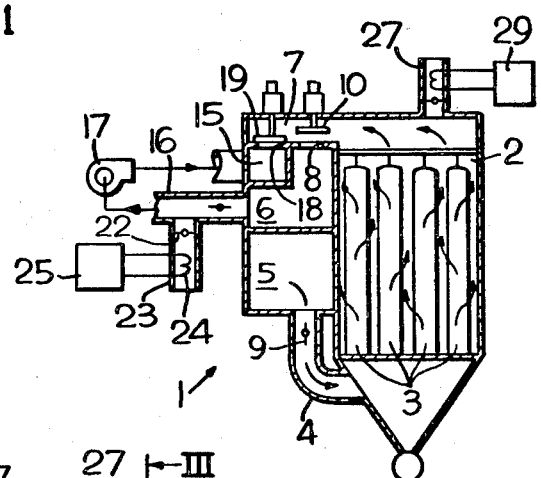
FIG. 3 is a cross-sectional view taken substantially along line III—III in FIG. 2.
Figure 2:
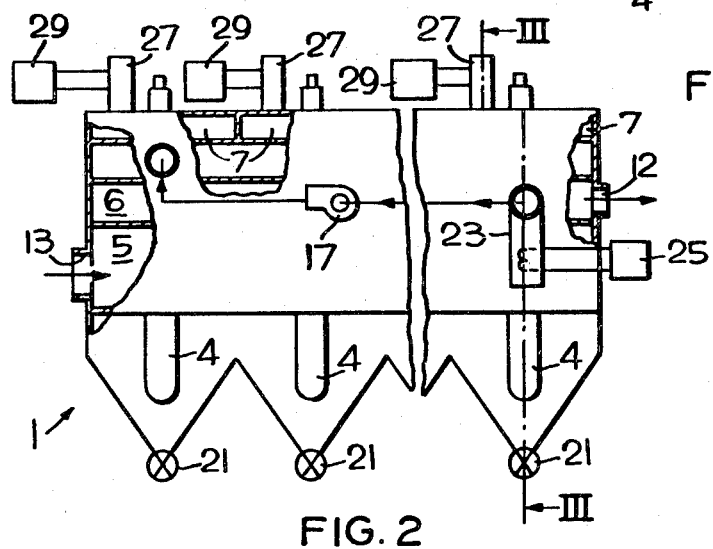
FIG. 2 is a front elevational view, partially in section, of the baghouse installation shown in FIG. 1.

Referring to FIGS. 1-3, the baghouse installation 1 incorporating the isolation and purging system embodying the invention includes a plurality of adjacent filter compartments 2 having a plurality of tubular filter bags 3 suspended within them to filter hot flue gases flowing through the compartments in the conventional manner. Each of the filter compartments 2 is connected through a separate inlet duct 4 to a common inlet manifold 5 and to a common outlet manifold 6 through a separate outlet passage 7 opening into the outlet manifold through an outlet port 8. The inlet ducts 4 are each provided with a conventional butterfly-type damper 9 which can be manipulated to close off the inlet ducts, and each of the outlet ports 8 has a poppet-type damper 10 similar to that shown in U.S. Pat. No. 3,898,997 overlying it for selectively closing off the outlet ports 8. As will be described, these dampers allow one of the filter compartments to be taken off line or isolated while keeping the other compartments in service.

As shown in the drawings, a blower or fan 11 is connected to an outlet 12 at one end of the outlet manifold 6 to maintain a draft in the filter compartments which draws the flue gases into the inlet manifold 5 through an inlet 13 in the end of the inlet manifold. The flue gases in the inlet manifold 5 are drawn by the draft into the filter compartments 2 through the inlet ducts 4 whereafter they flow through the filter bags and into the outlet manifold 6 via the outlet passages 7 and the outlet ports 8. In this regard, it should be noted that the blower is sized to maintain subatmospheric pressures within the manifolds and the filter compartments. For example, in a baghouse installation where each of the filter compartments contains 400 filter bags adapted to filter approximately 80,000 ACFM (actual cubic feet per minute) of flue gases, the blower 11 should maintain a pressure of about $-13$ inches water gauge in the outlet manifold. That results in a pressure of about $-7$ inches water gauge in the inlet manifold due to pressure losses in the gases as they flow through the filter compartments. Typically, in an installation utilizing fiberglas filter bags the pressure differential between the inlet and outlet manifolds will be in the range of 4–8 inches water gauge.

Figure 4:
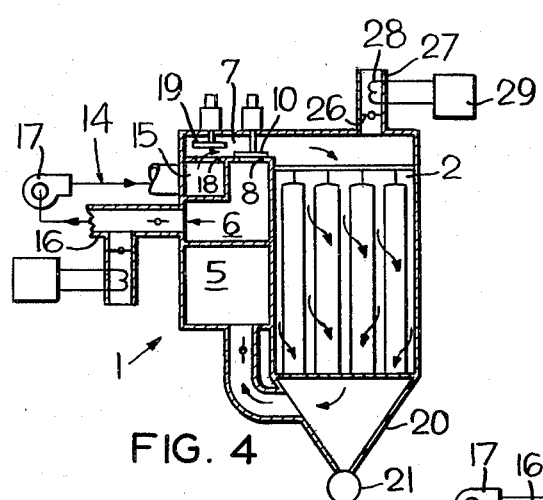
FIG. 4 is a view similar to FIG. 3 showing one of the filter compartments when its filter bags are being cleaned by the reverse gas cleaning system.

Referring to FIG. 4, the baghouse installation is provided with a reverse gas cleaning system 14 which is adapted to periodically direct a stream of filtered gases from the outlet manifold 6 through the filter bags 3 in a direction countercurrent to the direction of the dirty gas flow during normal filtering operations to dislodge accumulated particulate materials on the bags. The reverse gas system includes a reverse gas manifold 15 which extends across the width of the baghouse installation, a reverse gas conduit 16 connecting the reverse gas manifold 15 to the outlet manifold 6, and a blower or fan 17 adapted to draw the filtered gases from the outlet manifold 6 and direct them into the reverse gas manifold 15 which in turn feeds into the outlet passages 7 through a gas port 18 opening into each of the passages, it being noted that during normal filtering operations each of the gas ports 18 is closed off by a poppet-type damper 19 similar to the outlet damper 10 to prevent the gases from flowing between the reverse gas manifold and the outlet passages.

From the foregoing, it can be seen that the installation accommodates cleaning the filter bags in one of the compartments while maintaining normal filtering operations in the remaining compartments. This is accomplished by closing the outlet damper 10 to close off the outlet port 8 of the compartment containing the filter bags to be cleaned and then opening the damper 19 which normally closes off the reverse gas port 18 of that compartment. This allows the filtered gases in the reverse gas manifold 15 to be blown into the compartment by the blower 17 where they flow through the filter bags to dislodge any particulate materials on the bags which in turn fall into a hopper 20 from where they are removed through a valve 21 in the conventional manner. Thereafter, upon completing the bag cleaning cycle, the reverse gas damper 19 is moved to close off the reverse gas port 18 after which the outlet damper 10 is moved to open the outlet port 8 to resume normal filtering operations within the compartment while this cycle is repeated in the remaining compartments.

Figure 5:
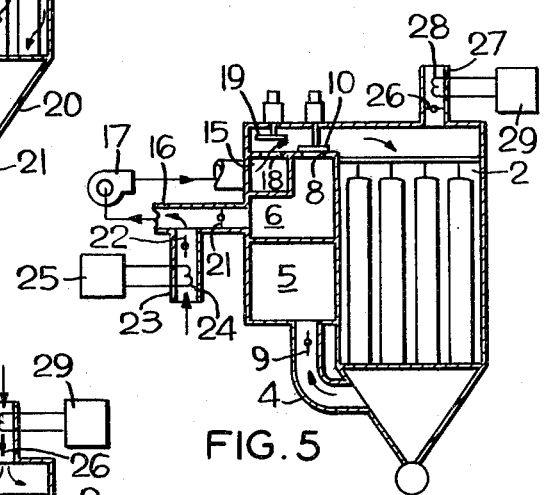
FIG. 5 is a view similar to FIG. 3 showing one of the filter compartments while the flue gases are being purged from the compartment.

As shown in FIG. 5, the invention provides for purging the flue gases from each of the compartments prior to isolating it or allowing it to cool down for routine maintenance. The invention also provides for preheating the filter bags and the structure of the compartment to minimize condensation of the corrosive agents in the flue gases when it is put back on line after it has been allowed to cool down.

Referring to FIG. 5, the first step in purging one of the compartments is to close the outlet damper 10 of the compartment and then open the reverse gas damper 19. Next, a butterfly-type damper 21 in the conduit 16 is closed to prevent the filtered gases in the outlet manifold from flowing into the compartment through the conduit 16. Then, another butterfly-type damper 22 is opened to allow ambient air to be drawn into the conduit 16 and blown into the compartment by the blower 17 whereafter the air flows into the inlet duct 4 to purge the flue gases from the compartment. As shown in the drawings, the damper 22 is mounted within an air duct or housing 23 which is connected to the conduit 16. The conduit 16 is vented to the atmosphere through the housing 23 which includes a heating element 24 connected to a suitable power source 25 for heating the ambient air as it flows into the conduit to a temperature above the dew point temperature of the corrosive agents in the gases. Typically, in installations for cleaning flue gases having substantial sulfide concentrations, the ambient air would be heated to a temperature in the range of about 245° to 335° F. In this regard, it should be noted that the heating element and the power source can be selected from any one of a variety of commercially available gas heating devices.

Figure 6:
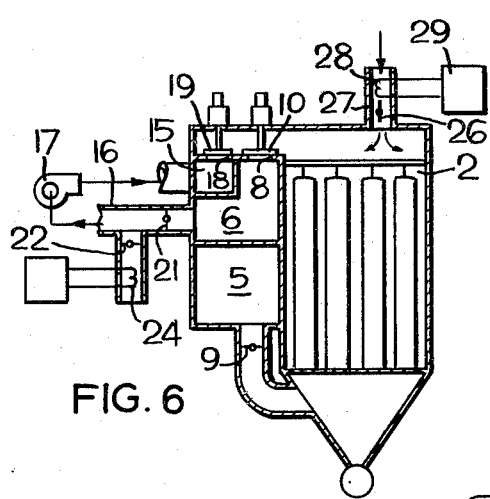
FIG. 6 is a view similar to FIG. 3 showing one of the filter compartments when it is isolated and charged with heated ambient air to prevent flue gases from seeping into the compartment.

After the flue gases have been purged from one of the compartments, the compartment is isolated by closing the inlet damper 9 to close off its inlet duct 4 and then closing the reverse gas damper 19 to close off its reverse gas port 18 as shown in FIG. 6. Next, the heating element 24 is turned off and the damper 22 is closed to prevent ambient air from entering the conduit 16 in the reverse gas system. Then, the gas damper 21 is opened to allow filtered gases in the outlet manifold 6 to flow into the reverse gas manifold 15 so that the reverse gas system can be used to clean the filter bags in the remaining compartments. When the foregoing steps are completed, the purged compartment is isolated within the baghouse installation. However, as discussed above in regard to the prior art, flue gases will seep through the closed inlet damper of the compartment. Consequently, if an isolated compartment in the flue gas cleaning system noted above is allowed to cool below the dew point temperature of the corrosive agents in the flue gases, in the range of 2–10 gallons of sulfuric acid would condense out of the gases seeping into the compartment during each hour the compartment is isolated. To prevent this from occurring, a butterfly-type damper 26 which is mounted within a housing 27 mounted on top of the compartment is opened to vent the compartment to the atmosphere. Since the blower 11 maintains the gases in the manifolds at subatmospheric pressures while the air in the vented compartment is at atmospheric pressure, this arrangement essentially eliminates the seepage of flue gases into the compartment. Therefore, after this step is completed the compartment can be allowed to cool and its access doors opened (not shown) to allow workmen to enter the compartment to conduct routine maintenance. Alternatively, if the compartment has been isolated to maintain the flow rates of the flue gases flowing through the remaining compartments while the boiler producing the flue gases is temporarily at a reduced load, the invention also provides for heating the ambient air to a temperature in the vicinity of the dew point temperature of the corrosive agents in the flue gases as the air flows into the compartment through the housing 27. This is done by a conventional heating element 28 connected to a power source 29 mounted within the housing 27. This arrangement maintains the temperature of the compartment near the dew point temperature of the corrosive agents to prevent air in the compartment, the filter bags, and the walls and other structure of the compartment from cooling the flue gases when the compartment is put back on line.

As noted above, the purging system can also be used to heat a cool compartment which has been taken off line for maintenance to a temperature near the dew point temperature prior to putting it back on line. This is accomplished by first closing the gas damper 21 in the conduit 16 and then opening the purging air damper 22 and turning on the heating element 24. Next, the reverse gas damper 19 is opened to allow the heated purging air to be blown into the compartment by the blower 17, whereafter the inlet damper 9 is opened to allow the stream of hot purging air to flow through the compartment. Later, after the purging gases have heated up the compartment to a temperature in the vicinity of the dew point temperature of the corrosive agents, the reverse gas damper 19 and the purging air damper 22 are closed and the heating element 24 is turned off. After these steps have been completed, the gas damper 21 is opened to allow the filtered gases to flow into the reverse gas manifold 15 to enable the reverse gas cleaning system to be used, and the outlet damper 10 is opened to resume normal filtering operations within the compartment.

Figure 7:
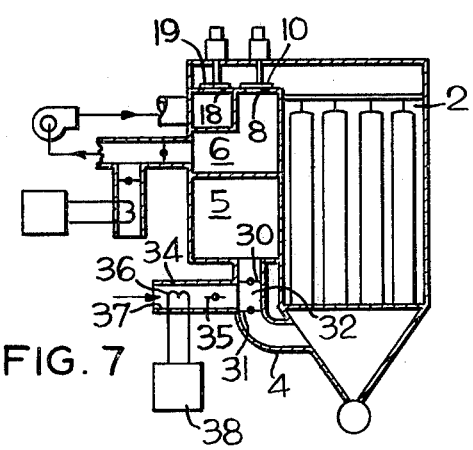
FIG. 7 is a view similar to FIG. 3 showing an alternative arrangement for isolating one of the filter compartments to prevent flue gases from seeping into the compartment.

FIG. 7, wherein like numbers identify the same elements as in FIGS. 1–6, shows an alternate arrangement for preventing the flue gases from seeping into the isolated filter compartments. As shown in the drawing, each of the inlet dampers includes a pair of closure members 30 and 31 which can be rotated between an open position allowing the flue gases to flow into its respective compartment and a closed position whereat the closure members 30 and 31 cooperate with the interior surface of the inlet duct 4 to form a chamber 32 within the inlet duct to isolate the compartment. An air damper housing 34 is secured to each of the inlet ducts which includes a conduit 37 having a butterfly-type damper 35 mounted within it which closes off the conduit during normal filtering operations, and alternatively, is opened to vent the chamber 32 to the atmosphere when its respective compartment is isolated.

The reverse air system and the purging system provided in the alternate arrangement are essentially the same as those provided in the first embodiment. Thus, after the flue gases have been purged from one of the compartments, the compartment is isolated by closing the inlet damper to close off its inlet duct 4 and then closing the reverse gas damper 19 to close off its reverse gas port 18. Upon completing these steps, the compartment will be isolated within the baghouse installation. After the compartment is isolated, the air damper 35 is opened to vent the chamber 32 to the atmosphere. Since the gas pressures within the compartment and the manifolds are below atmospheric pressure, the ambient air flows into the chamber 32 and forms a pressure barrier within the chamber which prevents the flue gases from seeping by closure members 30 and 31 into the isolated compartment. In practice, a small quantity of the ambient air in the chamber seeps past the closure members into the isolated compartment and the inlet manifold. Therefore, a heating element 36 connected to a conventional power source 38 is secured in the conduit 37 to heat the ambient air to a temperature in the vicinity of the dew point temperature of the corrosive agents in the flue gases as the air flows into the chamber 32. This prevents any air seeping past the closure members from cooling the flue gases trapped in the isolated compartment as well as the flue gases flowing through the inlet manifold. Typically, in baghouse installations for cleaning flue gases having substantial sulfide concentrations such as in the foregoing example, the ambient air would be heated to a temperature in the range of 245°–335° F., it being noted that this heating element 36 and the power source 37 can be selected from any one of a variety of commercially available heating devices.

The embodiments of the invention in which an exclusive property or privilege is claimed are defined as follows:

1. In a process for cleaning a dirty gas stream in a gas cleaning system having a plurality of filter compartments wherein hot dirty gases containing corrosive agents are directed into a common inlet manifold at a subatmospheric pressure and drawn through an inlet duct into each of the filter compartments where the dirty gases flow through filter bags supported within the compartments and exit each of the compartments and flow into a common outlet manifold through normally open first damper means in an outlet passage connecting each of the compartments to the common outlet manifold, the system further including a conduit connecting the outlet manifold to a reverse gas manifold including normally open second damper means adapted to regulate a flow of filter gases from the outlet manifold into the conduit, normally closed third damper means in the outlet passage of each of the compartments adapted to regulate a flow of filtred gases from the conduit into the compartments, and normally closed fourth damper means connected to the conduit between the compartments and the second damper means operable to vent the conduit to the atmosphere, the improvement comprising the steps of:

closing said first damper means of one of the compartments to prevent the flow of filtered gases into the outlet manifold;

opening said third damper means on said one compartment to allow filtered gases in the outlet manifold to flow into said compartment through the conduit connecting the outlet manifold to said compartment;

drawing filtered gases from the outlet manifold and directing said gases through the conduit into said one compartment through said third damper means so that they flow through the filter bags countercurrent to the normal flow of dirty gases;

closing said second damper means within the conduit to prevent the flow of filtered gases from the outlet manifold into the conduit;

opening said fourth damper means to vent the conduit to the atmosphere; and drawing a stream of ambient air through said fourth damper means and directing it through the conduit into said one compartment to purge dirty gases from within said compartment.

2. The process of claim 1 including the additional step of heating the ambient air stream to a temperature above the dew point temperature of the corrosive agents in the dirty gases.

3. The process of claim 1 in said gas cleaning system wherein each of the inlet ducts includes fifth damper means adapted to regulate the flow of dirty gases into the compartments, including the subsequent steps of:

closing said fifth damper means in the inlet duct of said one compartment to prevent the flow of dirty gases through said duct into said compartment and closing said third damper means, thereby isolating said compartment within the gas cleaning system.

4. The process of claim 3 including the subsequent steps of:

closing the first damper means of one of the remaining compartments;

opening said third damper means on said one remaining compartment and drawing a stream of filtered gases through the conduit from the outlet manifold and directing said gases into said one remaining compartment to flow through the filter bags countercurrent to the flow of dirty gases to clean the filter bags;

closing said third damper means; and opening said first damper means to resume normal filtering operations within said one remaining compartment.

5. The process of claim 3 in said gas cleaning system wherein each compartment includes normally closed sixth damper means operable to vent the compartment to the atmosphere, including the subsequent step of opening said sixth damper means to allow a stream of ambient air to flow into the compartment through said sixth damper means to form a pressure barrier essentially eliminating seepage of dirty gases into the compartment through said fifth damper means.

6. The process of claim 5 including the additional step of heating the ambient air stream to a temperature above the dew point temperature of the corrosive agents in the dirty gases prior to admitting it into the compartment through said sixth damper means.

7. In the process of claim 3 in said gas cleaning system wherein said fifth damper means includes a pair of spaced closure members forming a chamber within the inlet duct when said fifth damper means is closed and normally closed seventh damper means on the inlet duct in flow communication with said chamber to operate to vent said chamber to the atmosphere, the subsequent step of opening said seventh damper means to allow a stream of ambient air to flow into the chamber through said seventh damper means to form a pressurized zone within the inlet duct to prevent seepage of dirty gases into the isolated compartment.

8. The process of claim 7 including the additional step of heating the ambient air stream to a temperature above the dew point temperature of the corrosive agents in the dirty gases prior to admitting it into said chamber.

9. A baghouse installation for cleaning hot dirty gases containing corrosive agents, comprising:

a plurality of parallel filter compartments, each of said compartments having a gas inlet and a gas outlet, and a plurality of filter bags mounted within each of the compartments adapted to filter dirty gases entering the compartment through the inlets whereafter the resultant filtered gases exit the compartments through the outlets;

a common inlet manifold for the dirty gases connected with each of said inlets to accommodate the flow of dirty gases into the filter compartments;

a common outlet manifold for the resultant filtered gases connected with each of said outlets for conveying said gases away from the compartments;

blower means connected with the outlet manifold to draw the gases through the compartments at subatmospheric pressure;

first damper means operatively positioned and aligned with each of the outlets of the compartments selectively operable to close off a selected one of the compartments to prevent gases from flowing between said compartment and the outlet manifold;

a conduit connected with the outlet manifold including second damper means operably positioned and aligned with respect to the conduit to selectively close off the conduit;

a reverse gas manifold connected with said conduit and including a reverse gas port opening into each of the compartments;

third damper means operatively positioned and aligned with each of the reverse gas ports selectively operable to provide selective communication between the compartments and the reverse gas manifold;

second blower means connected with the conduit and the reverse gas manifold adapted to draw filtered gases from the outlet manifold and direct said gases into the reverse gas manifold; and a duct connected with the conduit between said second and third damper means including fourth damper means operatively positioned and aligned with respect to the duct to selectively vent the conduit to the atmosphere through the duct; whereby upon closing said first and fourth damper means and opening said second and third damper means filtered gases flow through the filter bags countercurrent to the normal flow of dirty gases thereby cleaning the filter bags, and upon closing said first and second damper means and opening said third and fourth damper means ambient air is drawn into the conduit and directed into said compartment to purge dirty gases from within the compartment.

10. The installation according to claim 9, and
gas heating means constructed and arranged with respect to said duct for heating the ambient air to a temperature above the dew point temperature of the corrosive agents in the gases prior to admitting it into the conduit.

* * * * *